Sept. 19, 1967  M. GAUTHRON  3,342,440

SUPPORT FOR NUCLEAR REACTOR FUEL ELEMENTS

Filed June 28, 1965

United States Patent Office 3,342,440
Patented Sept. 19, 1967

3,342,440
SUPPORT FOR NUCLEAR REACTOR FUEL ELEMENTS
Maurice Gauthron, Paris, France, assignor to Commissariat à l'Energie Atomique, Paris, France
Filed June 28, 1965, Ser. No. 467,241
Claims priority, application France, July 7, 1964, 980,899
3 Claims. (Cl. 248—1)

This invention relates to a device for supporting fuel elements in the vertical position within channels which extend through the solid moderator stack of a nuclear reactor.

Among the devices of this type which are at present known, use is made in particular of those which employ cylindrical sleeves of graphite or like material for supporting each sepaarte fuel element by means of a stirrup formed either of metal or also of graphite, the said stirrup being joined to the body of the sleeve and to the lower extremity of the fuel element by flexible wires which are preferably of stainless steel.

In an improved variant of a device of this type, the support can consist of a metal part in one form of a spider with a plurality of lateral arms and placed at the lower end of the sleeve, said support comprising a central portion on which the fuel element rests whilst the extremities of the lateral arms which are in contact with the sleeve consist of flat vertical portions which are adapted to slide within longitudinal grooves formed along generator-lines in the internal wall of said sleeve until said extremities come into abutting engagement within a transverse circular channel or groove formed in said sleeve for the purpose of arresting the longitudinal movement of the support.

The present application is concerned with a novel improvement made in the device of the type hereinabove described which makes it possible in particular to improve the attachment of the extremities of the lateral arms of the metal part to the cylindrical sleeve.

To this end, said improvement is essentially characterized in that the extremities of the lateral arms are directly made integral with the sleeve by means of a suitable fixing device consisting in particular of a screw and nut system.

The exemplified embodiment which is given hereinafter solely by way of indication illustrates one particular application of the improvement in accordance with the present invention.

Figure 1:
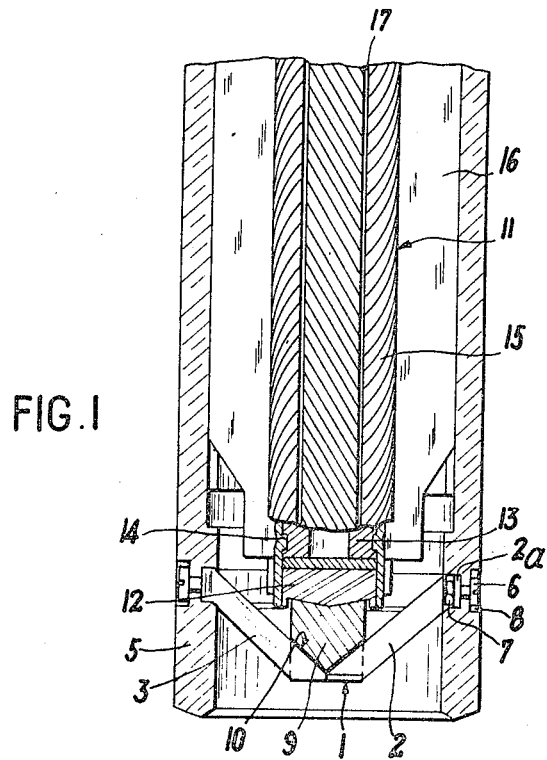

In the accompanying sheet of drawings, FIG. 1 is a diagrammatic view in partial vertical cross-section of a sleeve fitted with a support which is constructed in accordance with the invention.

Figure 2:
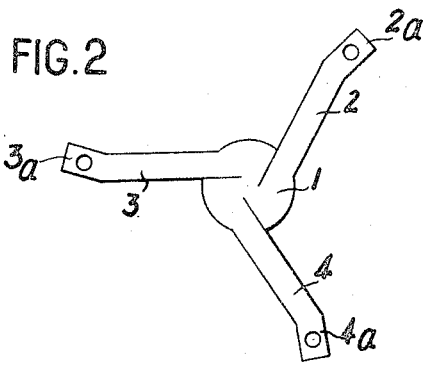

FIG. 2 is an overhead view of a support of this type prior to assembly within its sleeve.

As can be seen from these figures, the support considered is made up of a central portion 1 and three lateral arms such as the arms 2, 3 and 4. The complete support can be obtained by any suitable means and especially by cutting out and bending of a metal plate or by welding of the arms 2, 3 and 4 to the central portion 1. Each of these lateral branches is folded back or secured to this central portion in such manner as to be located in a plane which passes through the axis of the central portion 1 as shown in FIG. 1. In accordance with the invention, the extremities such as 2a, 3a and 4a of the lateral arms are fixed directly against the internal wall of an annular sleeve 5 of graphite or any other suitable material such as, in particular, zircaloy or steel which is intended to surround the fuel element.

As can more especially be seen from FIG. 1, the attachment of the lateral arm extremities can be carried out, for example, by means of assemblies each consisting of a screw 6 and nut 7 disposed within recesses such as the recess 8 which are suitably arranged within the thickness of the sleeve 5. There is fixed on the central portion 1 of the support a pastille or seating block 9 of graphite in which are formed slots such as the slot 10 so as to permit the insertion therein of the lateral arms 2, 3 and 4 of the support. The fuel element 11 is carried on said seating block 9 by means of its end cap 12. The fuel element 11 is represented as partly cut away in the figure in order to show at 13 the fuel rod or slug contained within the fuel element and at 14 the fuel can which surrounds said rod. In the example of embodiment which is illustrated, said fuel can 14 is provided with fins 15 which are preferably formed in a herringbone configuration, longitudinal centering walls or splitters such as 16 being fitted within one out of two of the grooves 17 formed between these herringbones with a view to centering the fuel element 11 within the surrounding sleeve 5.

As will be readily understood, the invention is not limited to the form of embodiment which has been described and illustrated and which has been given solely by way of example. In particular, the fixing of the arms of the support to the sleeve can be carried out by any suitable means, in particular by welding.

I claim:

1. Support for nuclear fuel element comprising an annular sleeve, a spider at the lower end of said sleeve supporting a fuel element, a flat center portion for said spider, a plurality of arms laterally extending from said center portion and having vertical edge portions and means for securing the extremities of said arms to said sleeve comprising a screw and nut system.

2. A support as described in claim 1 including a graphite seating block on said flat center portion and radiating slots at one end of said block with said vertical edge portions disposed in said slots.

3. A support as described in claim 1, said spider being sheet metal with said arms twisted to provide said vertical edge portions thereof.

References Cited

UNITED STATES PATENTS

| | | | |
|---|---|---|---|
| 2,532,931 | 12/1950 | Miller | 248—44 |
| 2,826,281 | 3/1958 | Johnson | 248—43 X |
| 2,857,506 | 10/1958 | Minteer | 240—10 |
| 3,100,743 | 8/1963 | Aubert et al. | 176—87 |
| 3,274,071 | 9/1966 | Janusz et al. | 176—77 |

JOHN PETO, *Primary Examiner.*